US009479091B2

(12) United States Patent
Sauer

(10) Patent No.: US 9,479,091 B2
(45) Date of Patent: Oct. 25, 2016

(54) CIRCUIT FOR THERMAL PROTECTION AND POWER REGULATION OF ELECTRIC MOTORS

(71) Applicant: ebm-papst Mulfingen GmbH & Co. KG, Mulfingen (DE)

(72) Inventor: Thomas Sauer, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 105 days.

(21) Appl. No.: 14/333,717

(22) Filed: Jul. 17, 2014

(65) Prior Publication Data

US 2015/0022133 A1 Jan. 22, 2015

(30) Foreign Application Priority Data

Jul. 22, 2013 (DE) ......................... 10 2013 107 819

(51) Int. Cl.

| | |
|---|---|
| *H02K 11/00* | (2016.01) |
| *H02P 3/06* | (2006.01) |
| *H02H 5/04* | (2006.01) |
| *H02H 7/085* | (2006.01) |
| *H02H 9/02* | (2006.01) |
| *H02P 29/00* | (2016.01) |
| *H02P 29/02* | (2016.01) |
| *H02K 23/36* | (2006.01) |

(52) U.S. Cl.
CPC *H02P 3/06* (2013.01); *H02H 5/04* (2013.01); *H02H 7/0852* (2013.01); *H02H 9/026* (2013.01); *H02P 29/0055* (2013.01); *H02P 29/02* (2013.01); *H02K 23/36* (2013.01)

(58) Field of Classification Search
CPC ...... H02P 3/06; H02P 29/0055; H02P 29/02; H02H 9/026; H02H 5/04; H02H 7/0852; H02K 23/36
See application file for complete search history.

(56) References Cited

U.S. PATENT DOCUMENTS

| | | | |
|---|---|---|---|
| 5,530,613 A * | 6/1996 | Bauer ................... | H02H 3/025 361/27 |
| 2006/0087774 A1* | 4/2006 | Bielesch ............... | H02H 7/0852 361/23 |
| 2014/0265742 A1* | 9/2014 | Vehige .................. | H02K 23/36 310/68 C |

\* cited by examiner

*Primary Examiner* — Bentsu Ro
*Assistant Examiner* — Zemenay Truneh
(74) *Attorney, Agent, or Firm* — Brinks Gilson & Lione

(57) ABSTRACT

A circuit for thermal protection and power regulation as a function of the current winding temperature of phase windings of an electric motor. The circuit including at least one temperature monitor switch (TW1, TW2) that measures the winding temperature of the phase windings, and that upon attainment of a specific winding temperature shuts off the winding current flowing through the windings, the circuit further including a PTC thermistor that is associated with the phase windings and that, upon attainment of a specific winding temperature, reduces power by means of a resistance increase, or shuts the motor off. One of the phase windings has the PTC thermistor. The other phase windings or winding has a temperature monitor switch. The PTC thermistor and the temperature monitor switch or switches (TW1, TW2) are connected in series to a voltage source.

6 Claims, 1 Drawing Sheet

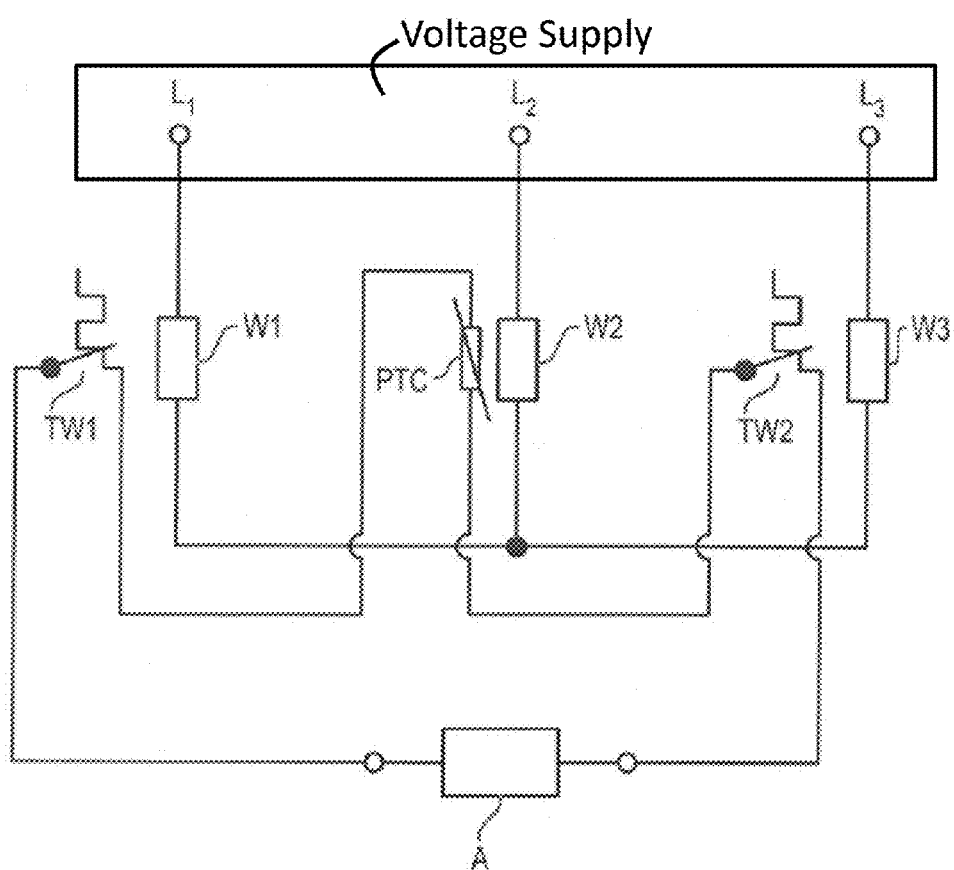

CIRCUIT FOR THERMAL PROTECTION AND POWER REGULATION OF ELECTRIC MOTORS

CROSS-REFERENCE TO RELATED APPLICATIONS

This application claims priority to German Patent Application No. 10 2013 107 819.2, filed Jul. 22, 2013.

FIELD OF THE INVENTION

The present invention relates to a circuit for thermal protection and power regulation as a function of a current winding temperature of the phase windings of an electric motor, of a type having, on the one hand, a temperature monitor switch that measures the winding temperature of the phase windings and upon attainment of a specific winding temperature—the switching temperature—shuts off the winding current flowing through the windings, and on the other a thermistor that is associated with the phase windings, and upon attainment of a specific winding temperature, reduces the motor power by raising the resistance.

BACKGROUND

The protection of a three-phase electric motor against thermal overload is achieved in a known manner by three temperature monitor switches, wherein preferably these are bimetal switches. The temperature of each motor phase is sampled with its own temperature monitor so as to be able to detect even asymmetrical temperature increases, e.g. due to winding insulation damage. The three temperature monitor switches are connected in series. When the switching temperature of one of the temperature monitor switches is exceeded, it opens. The interruption is recognized in the evaluation electronics and the action required for the specific protection concept is triggered. Typically this means disconnection of the winding current flowing through the phase windings. Further, it is known hereby to provide a thermistor, by means of which phase-winding-dependent power regulation can occur. The resistance value of the thermistor, increasing with the temperature, is used to measure the current winding temperature, e.g. by measuring the voltage drop across the thermistor when a constant current is superimposed. When a temperature is too high, the power to the motor is reduced. Based on the assumption that with a properly functioning motor, temperatures in the phase windings are approximately equal, only one thermistor is used, in order to reduce the expense. In order to be able to evaluate the series circuit of the three temperature monitor switches by means of the evaluation electronics, two connections are needed to the signal electronics. Two connections to the electronics are likewise needed for evaluation of the thermistor using the evaluation electronics. Thus a total of four connections are needed between the electric motor and the evaluation electronics. This results in higher circuitry and component expense.

The invention has the basic object of reducing the circuitry expense for the thermal monitoring and power regulation of electric motors.

SUMMARY

The above object is achieved in the invention in that in an electric motor that must be monitored and has a number of phase windings, one of the phase windings has the thermistor and the other phase winding or windings each have a temperature monitor switch, wherein the thermistor and the temperature monitor switch(es) are connected in series to a voltage source.

It is hereby further inventively advantageous if the series circuit of thermistor and temperature monitor switch is connected to the evaluation electronics such that a constant current is superimposed on the series circuit, a voltage drop is measured across the series circuit and motor power is reduced or motor current interrupted depending on the amount of the voltage drop.

Inventively each phase winding can also be sampled separately for thermal overloading, and in addition, the current temperature of a phase winding can be measured with the same circuit. The thermistor inventively serves both for temperature regulation and for cutoff when the temperature is too high. The evaluation for excess temperature protection takes place, for example, in such a way that the evaluation electronics shut off the electric motor upon reaching a voltage value that is dependent on the choice of the particular thermistor and the strength of the constant current. If the temperature increases in the inventive circuit, the resistance of the thermistor also increases. If the voltage across the series circuit of two temperature monitor switches and the thermistor is too high, the evaluation electronics shut off the electric motor. In the event one of the two temperature monitor switches reaches its cut-off temperature before reaching the voltage switching threshold of the thermistor, the particular temperature monitor switch opens and the voltage across the series circuit reaches its maximum value, i.e., a value in any case above the cut-off threshold of the thermistor and the motor is turned off. It is also inventively possible if the resistance value of the thermistor is measured before reaching the cut-off temperature of the temperature monitor switches, and thus the current temperature can be determined. Based on the inventive switch, when a temperature switch opens, evaluation of the temperature is no longer necessary, since the motor is stopped when the temperature monitor switch is opened. When the electric motor cools, the particular opened temperature monitor switch is again closed. The electronics determine the voltage value in the inventive series circuit, the value now lying below the cut-off threshold, and puts the motor in operation. Inventively a total of only two connections to the evaluation electronics are accordingly required. Thus in the invention, only one circuit part is required rather than two different evaluation circuits. In addition the invention saves a temperature monitor switch.

BRIEF DESCRIPTION OF THE DRAWINGS

Advantageous embodiments of the invention are described in more detail with reference to the embodiment shown in the FIGURE, wherein:

FIG. 1 shows the wiring diagram of the electric motor.

DETAILED DESCRIPTION

While certain features of the inventive circuit or its component parts either described and/or derivable from the FIGURE may only be described in conjunction with one or several other features, they are also essentially independent of this embodiment as individual features or also in combination with other features of the embodiment and are claimed as belonging to the invention.

FIG. 1 shows the wiring diagram of the electric motor with three motor windings W1, W2, and W3, which are connected via lines L1, L2, and L3 to the voltage supply. The motor is powered here, for example, in a star type three phase circuit.

Temperature monitors TW1 and TW2 as well as a PTC (positive temperature coefficient) thermistor, which are connected to one other in a series circuit in any desired order, are associated with the windings. The PTC thermistor is in particular a PTC resistor.

The ends of this series circuit are connected to an evaluation circuit A. By means of the evaluation circuit A, each phase winding W1, W2, and W3 can be sampled separately for thermal overload and in addition, the current temperature of the phase winding can be measured with the same circuit. The PTC thermistor then serves both for temperature regulation and for shutting off this phase when the temperature is too high. The evaluation for excess temperature protection occurs in such a way that, for example, evaluation electronics A superimpose a constant current on the series circuit of two temperature monitors TW1 and TW2 and the PTC thermistor, and measure the voltage drop across the series connection.

When a voltage value dependent on the choice of PTC thermistor and the amount of constant current is reached, the motor is switched off by the signal electronics.

As the temperature increases, the resistance value of the PTC thermistor increases. If the voltage across the series circuit of two temperature monitors TW1 and TW2 and the PTC thermistor becomes too high, the electronics A then shut the motor off. If one of the two temperature monitors TW1 or TW2 reaches its cut-off temperature before reaching the voltage switching threshold, the appropriate temperature monitor TW1 or TW2 opens, and the voltage is at a maximum across the series circuit, i.e. in any case above the cut-off threshold of the PTC thermistor. The motor is shut off.

Before reaching the cut-off temperature of the temperature monitors TW1, TW2 the resistance value of the PTC thermistor is measured and thus the current temperature is determined.

If one of the temperature monitors TW1 or TW2 has opened, temperature evaluation is no longer necessary, since opening shuts off the motor. When the motor cools, this temperature monitor TW1 or TW2 is again turned on. The electronics A recognize the voltage value below the cut-off threshold and again place the motor in operation.

It should also be pointed out that because of the winding technology of the motor, it is often not necessary to provide a temperature sensor for each winding. In many cases the windings lie so closely together that a temperature monitor is impacted by two windings and interrupts the supply voltage of the motor after reaching the cut-off temperature.

While the above description constitutes the preferred embodiment of the present invention, it will be appreciated that the invention is susceptible to modification, variation and change without departing from the proper scope and fair meaning of the accompanying claims.

The invention claimed is:

1. A circuit for thermal protection and power regulation as a function of the winding temperature of an electric motor having at least a first and a second phase winding, comprising
    at least one temperature monitor switch measuring the winding temperature of the first phase winding which, upon attainment of a specific winding temperature defining a switching temperature, shuts off the winding current flowing through the first windings, and
    a thermistor, which is associated with the second phase winding and which, upon attainment of a specific winding temperature, reduces the power of the motor by increasing the resistance, or shuts the motor off,
    wherein the temperature monitor switch and the thermistor are connected in a series circuit to a voltage source; the series circuit being connected to evaluation electronics in such a way that a constant current is applied through the series circuit, an evaluation electronics is configured for measuring a voltage drop across the series connection, and the power to the motor is reduced or the motor current is interrupted according to the value of the voltage drop;
    wherein upon reaching a cut-off temperature of the temperature monitor switch, the temperature monitor switch opens and the motor current is interrupted by means of the evaluation electronics in accordance with the maximum voltage drop measured across the series circuit.

2. The circuit according to claim 1 further comprising in that the temperature in at least one of the first and second phase winding is determined by measurement of the voltage drop across the temperature monitor switch using the evaluation electronics.

3. The circuit according to claim 1 further comprising in that the evaluation electronics is configured such that, after the motor is shut-off and upon cooling of the electric motor below a cut-off temperature of the temperature monitor switch that caused the shut-down, the temperature monitor switch is again closed and, by means of the evaluation electronics, a voltage drop across the series circuit below the cut-off threshold value is measured and the motor current is again turned on.

4. The circuit according to claim 1 further comprising in that the series circuit has only two connections with the evaluation electronics.

5. The circuit according to claim 1 further comprising in that the motor having a third winding and the series circuit consists of two temperature monitor switches and the thermistor, wherein the thermistor is positioned between the two temperature monitor switches within the series circuit.

6. The circuit according to claim 1 further comprising in that the thermistor is a positive temperature coefficient resistor.

* * * * *